United States Patent Office 3,328,120
Patented June 27, 1967

3,328,120
PROCESS FOR OBTAINING POTASSIUM SULFATE FROM MINERAL SALTS COMPRISING POTASSIUM - MAGNESIUM SULFATES AND CHLORIDES, PARTICULARLY KAINITIC MINERAL
Iti Mini, Milan, Italy, assignor to Montecatini Edison S.p.A., a corporation of Italy
Filed Nov. 20, 1962, Ser. No. 238,891
Claims priority, application Italy, Nov. 22, 1961, 20,995/61
9 Claims. (Cl. 23—121)

This invention relates to a process for preparing potassium sulfate from mineral salts, that is, minerals containing potassium-magnesium sulfates and chlorides, particularly kainite.

The process is suitable for preparing potassium sulfate starting with a salt material or salts containing the ions K, Mg, Cl, $SO_4$. The material may contain NaCl as impurity.

By conventional processes potassium sulfate is obtained from kainite in about 70% yields. It is also known that with some processes 90–95% yields are obtainable. However, the latter processes either require use of foreign chemical elements, such as lead, or have not found practical application owing to the fact that the kainitic $MgSO_4$ presents difficulties in leaving the processing cycle (note German patent publication No. 1,086,220).

The process of the present invention avoids these disadvantages, while still obtaining potassium sulfate in high yields, i.e. 90–95%, by processing the kainite or a potassium and/or magnesium salt containing $SO_4$ in its molecule.

Said process consists essentially of the following three steps, which can be followed in FIG. 1:

(a) A portion of the potassium mineral consisting of potassium or potassium-magnesium chlorides or sulfates is reacted together with recycled artificial carnallite, in countercurrent with water at 10°–40° C. to obtain potassium sulfate in very high potassium yields (90–95% based on the entire processed ore), and also residual mother liquors of a composition that is almost independent of the temperature;

(b) A second portion of the potassium-containing ore is reacted, at a temperature in the range between 100° and 130° C., with recycled mother liquors comprising a 30–35% solution of $MgCl_2$, and with residual mother liquors, while carrying out thereupon a concentration operation. By this second step a solid residue is separated consisting of kieserite and halite. The resulting mother liquors are utilized in the third operative step;

(c) This step consists in cooling the warm mother liquors, originating from operation (b), which liquors still contain all the $K_2O$, from 100°–130° C. to temperatures in the range from 30° to 60° C. In this way artificial carnallite crystallizes, which is separated and recycled to step (a), whereas the final mother liquors (30–35% $MgCl_2$ solution) resulting from this third operative step are, as stated above, partially recycled to the preceding step (b), and partially discarded. An advantage of the new process is the obtaining of final solutions comprising 30–35% $MgCl_2$ solution, in contrast with the very diluted (10–15%) solutions generally obtained by known processes.

Accordingly, said final solutions are profitably subjected to further processing to obtain magnesium salts, magnesium oxide, metallic magnesium and chlorine. Moreover, the process can be employed even when only sea water is available. And further, the kieserite residue obtained by the present invention originates from the process itself. It occurs as a precipitate having characteristics making it more readily available for further utilization than the kieserite residues, of natural origin, of other known processes.

An outstanding feature of this invention is that it has a high degree of adaptability inasmuch as it permits potassium minerals of most varied types to be processed, such as kainite, carnallite, langbeinite, sylvinite or mixtures thereof, in more or less pure state.

The following reaction schemes confirm the flexibility of the invention:

When only kainite is processed, it decomposes according to the following over-all scheme:

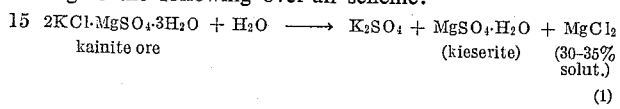

(1)

When besides kainite, other potassium or potassium-magnesium salt is available, such as carnallite, sylvinite, hard salt, mixed salt, etc., there occur, together with reaction (1), also the following reactions:

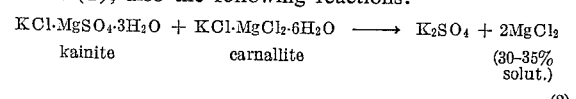

(2)

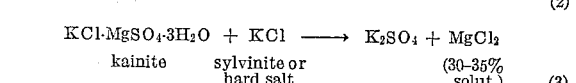

(3)

Other salts can be employed, as shown by the examples below. For example, the following over-all reactions occur from langbeinite+sylvine or hard salt or sylvinite:

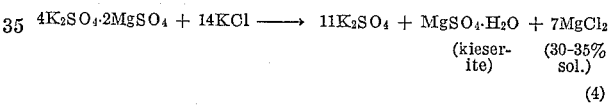

(4)

From magnesium sulfate (kieserite or bitter salt) and carnallite:

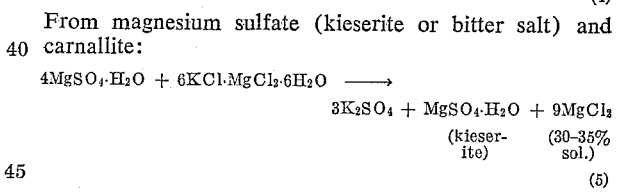

(5)

Ultimately the following three final products are obtained:

$K_2SO_4$ of high titer (50–52% $K_2O$)
$MgSO_4 \cdot H_2O$: solid kieserite mixed with NaCl
$MgCl_2$: 30–35% solution.

The high yield (>90%) in which $K_2SO_4$ is obtained is due to the fact that the $K_2O$ content in the other two exiting substances (kieserite residue: 1–1.5%; $MgCl_2$ solution: 0.2–0.5%) is quite negligible, and corresponds to an over-all yield loss of not more than 4–5%.

A detailed description of the process follows.

Figure 4:
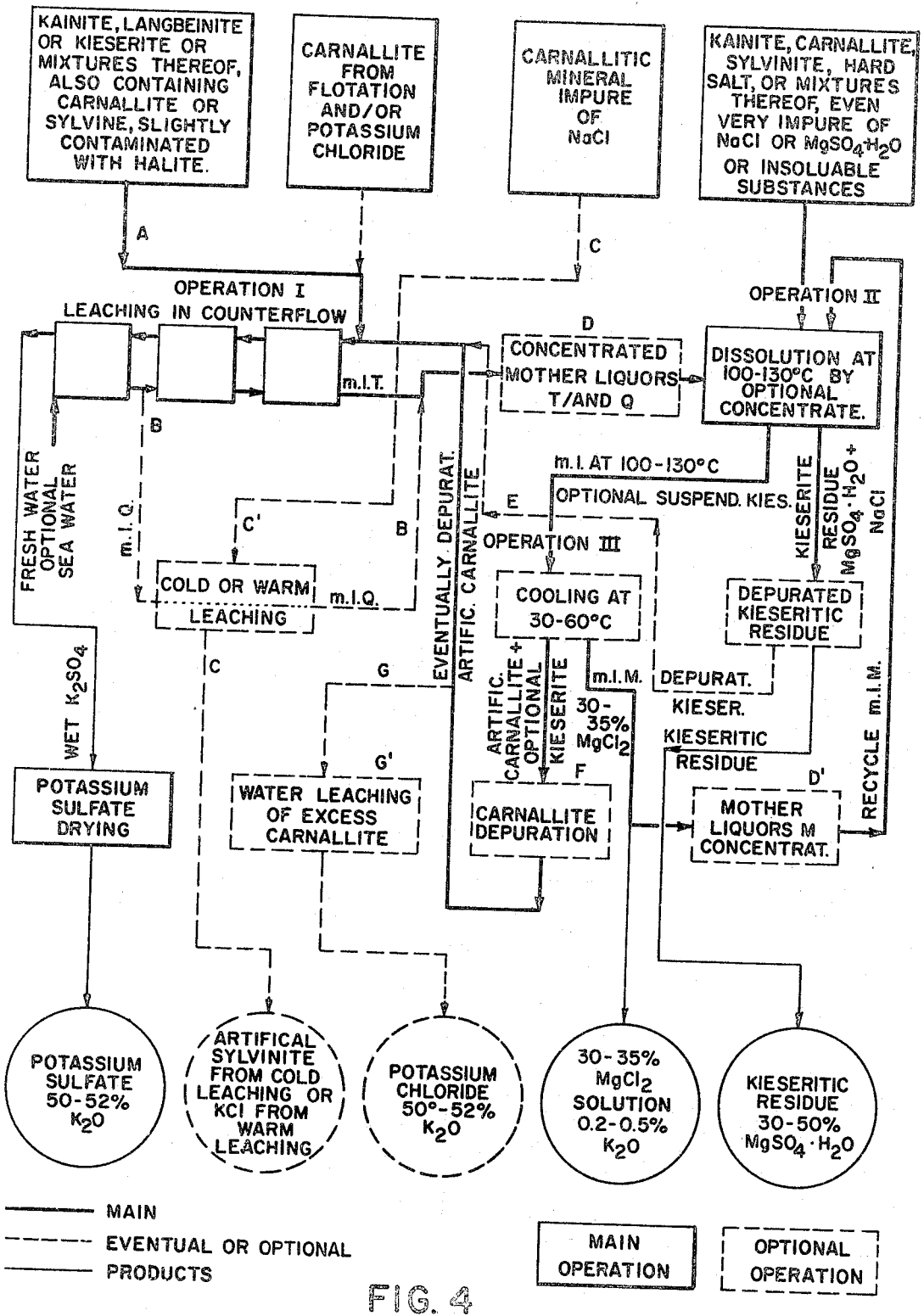

FIG. 4 presents a general scheme wherein the main operations are represented by continuous thick lines, and the products obtained by thin continuous lines. The dashed thin lines represent process alternatives, indicating the flexibility of the same.

Said optional operations are illustrated by the more detailed description with respect to FIG. 4 of the accompanying drawing (see descriptions in subsequent pages):

A—in the place of artificial carnallite of recycle, carnallite from floatation or potassium chloride may be used.

B—if kainite and carnallite, which enter into operation I, are too impure of sodium chloride, it is necessary to eliminate it from the operation by taking away mother liquors Q.

C and C'—said mother liquors Q can be utilized before being brought together again with mother liquors T in order to produce potassium chloride from carnallitic mineral.

D and D'—mother liquors T and Q and mother liquors M, before being conveyed to operation II, can be each single and separately concentrated, thus avoiding concentration in the operation II.

E and E'—the kieseritic residue can be depurated, in order to remove sodium chloride, and recycled to operation I.

F—the artificial carnallite can be depurated in order to remove sodium chloride before being recycled to operation I, thus reducing or eliminating the withdrawal of mother liquors Q from operation I to convey then to operation II.

G and G'— a portion of artificial carnallite produced by operation III can be removed from cycle in order to produce potassium chloride.

Figure 2:
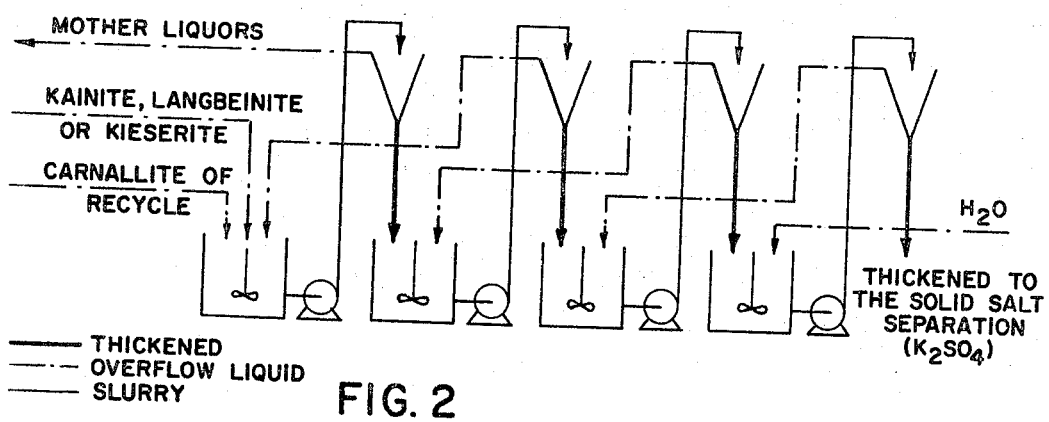
FIG. 2 illustrates a countercurrent leaching apparatus employed in operation I, for a plant of large output.

The three operations described above will now be explained in greater detail:

(I) Counterflow leaching with water is carried out in operation I, at constant temperature in the range between 10° and 40° C., on kainite and/or kieserite and/or langbeinite plus carnallite recycled from operation III in suitable ratio. The counterflow leaching may be carried out in a continuous screw conveyor, for small output, whereas for large output the scheme of FIG. 2 is adopted. FIG. 2 illustrates multiple groups of reactor+thickener, in series. Countercurrent operation adavntageously combines in one operation no less than three different operations; namely, producing pure sulfate, since the initial step is a water washing, obtaining residual mother liquors (which will be called m.l. T) in equilibrium with carnallite, kainite, sylvine and halite, having a composition almost independent of the temperature, containing 1.7–2% $K_2O$, and requiring the lowest amount of reaction water.

Figure 1:
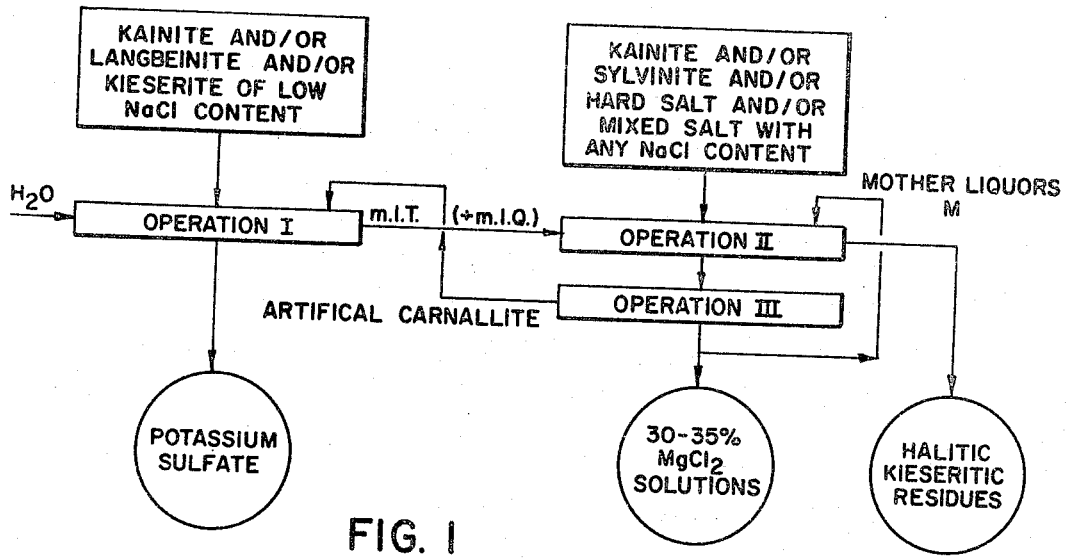
FIG. 1 illustrates the over-all scheme of one embodiment of the process.

(II) Dissolution of a potassium or potassium-magnesium salt, containing NaCl or $MgSO_4 \cdot H_2O$ impurities, at 100–130° C., in a recycled 30–35% solution of $MgCl_2$ (which will be named mother liquors M). The 30–35% solution of $MgCl_2$ is recycled from operation III, as is shown in FIG. 1. During this operation also the m.l. T mother liquors residual from operation I are added, and a concentration is carried out. However, the concentration may be carried out previously, and separately, on mother liquor M and on m.l. T, or on only one of the two, within limits which, depending on the adopted ratios, may be comprised between the needed concentrated hot solution, and total dryness. The ratio by weight between m.l. M and the solid salt may be between 3 and 25, and is preferably between 7 and 15. During this operation the $K_2O$ is dissolved, whereas most of the $SO_4$ contained in the added salt (for instance, pure kainite) and in mother liquor T precipitates in the form of kieserite.

Moreover NaCl and the natural kieserite present in the added salt remain undissolved. The residue, termed kieseritic residue, made up of $NaCl+MgSO_4 \cdot H_2O$ is separated at high temperature.

(III) Operation III involves cooling the warm solution, which still contains all of the $K_2O$, from 100°–130° to 30°–60° C. to crystallize out artificial carnallite, which is separated and recycled to operation I. Cooling is advantageously carried out under vacuum, with evaporation. However, cooling may also be carried out by thermal exchange. In this case, however, the concentartion step of operation II must be carried out to a higher degree. Final solutions are obtained comprising 30–35% $MgCl_2$, with 0.2–0.5% max. $K_2O$. They constitute mother liquors M, which are partially recycled to operation II, and partially discarded from the cycle and conveyed to a further processing.

Concerning the general process, it is necessary to note as follows:

(a) Mother liquors T (from operation I) are relatively poor solvents for NaCl (namely 0.7–1% max.), and therefore in order to avoid pollution of the potassium sulfate it is necessary:

either to employ for operation I only floated kainite having a low NaCl content;
or by applying one of the known methods, for example by taking advantage of the different specific weights, to separate the NaCl, which crystallizes together with the artificial carnallite, from said carnallite;
or to discard from operation I, besides m.l. T, also intermediate mother liquors which will be called Q, which have an NaCl concentration much higher than m.l. T.

The m.l. Q must be conveyed, together with m.l. T, to operation II; the conveying of m.l. Q involves overburdening the concentration owing to the necessity of evaporating a higher amount of water. A kainite with Na content not higher than 3–4% is profitably utilized for operation I.

(b) In operation I also flotation carnallite may be employed, or it may be replaced by KCl. Thus, no potassium salt will be introduced into operation II, and the carnallite produced in III to be recycled into I, in addition to the potassium salt, will be only the one corresponding to the $K_2O$ contained in m.l. T (and Q). Analogously, the kainite (or langbeinite or $MgSO_4$ introduced in I) may also be mixed with carnallite.

(c) The mineral potassium salt, introduced into operation II, may be of various types, viz. kainite, carnallite, sylvinite, hard salt, or mixtures thereof, and can contain impurities such as NaCl, kieserite, or insoluble substances. In fact, NaCl, kieserite, and insoluble substances leave unchanged, together with the kieseritic residue.

(d) The $K_2O$ content of the potassic raw material introduced into operation II may vary from 10% to 100% of the total $K_2O$. The actual fraction depends upon the available raw materials, upon the Na content thereof, and upon the eventual employment, as raw material, of the recycled precipitated kieserite.

(e) The process can also be used to produce KCl. This can be done by any one of the following three procedures:

(e') leaching, with water, the carnallite produced in excess in operation III, while recycling the mother liquors to operation II,
(e'') cold leaching the carnallitic minerals with m.l. Q, to produce artificial sylvinite which is separated by flotation,
(e''') warm leaching the carnallitic minerals with m.l. Q, separating NaCl to obtain KCl, by subsequent cooling.

In proceeding according to e'' and e''' a specific steam saving results, referred to the $K_2SO_4$ produced.

(f) No fresh water is necessary in the process. The fresh water required for operation I may be replaced by sea water, up to about 70–80%, utilizing for the remainder condensed water recovered in operations II or III, so that in practice no fresh water is required. The only disadvantage is a moderate burden in the concentration step.

Figure 3:
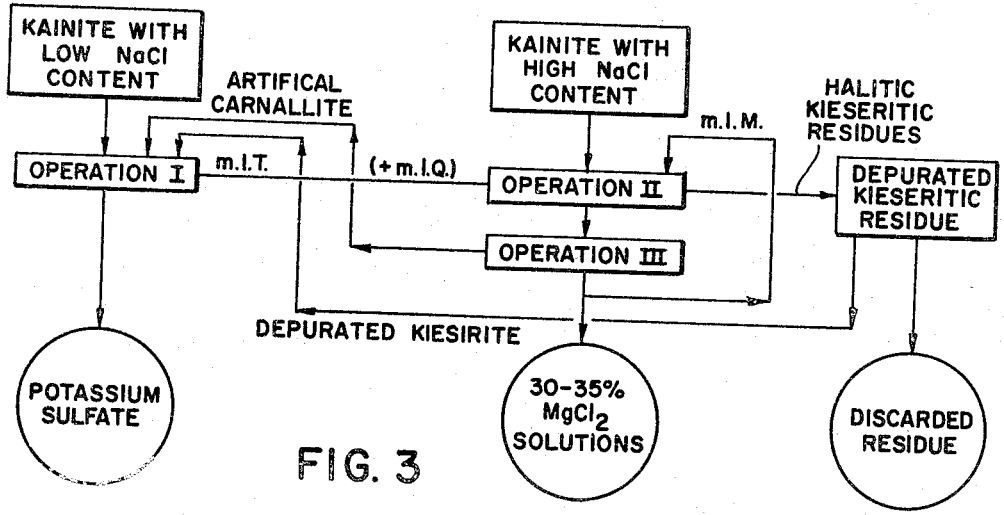
FIG. 3 is a flow diagram of another embodiment of the process.

(g) The potassium salt containing $SO_4$ ions, introduced into I, may be replaced, partially or totally, by kieserite, coming from the kieseritic residue depuration step of the process illustrated in FIG. 3.

Depuration may be carried out, during the processing, by taking advantage, through known methods, of the different decantation rates of NaCl crystals and kieserite crystals. Namely, in the warm separation carried out in operation II all of the NaCl is separated, whereas the kieserite is left in the liquid going to the cooling operation III.

FIG. 4 illustrates the over-all process, in which the alternative steps described above have been added to the reaction scheme of FIGS. 1 and 3.

The following examples describe preferred embodiments, but are not intended to limit the invention.

*Example 1*

780 g. kainite containing 16.7% $K_2O$ and 3% Na and 1000 g. of recycled carnallite containing 11% $K_2O$, 2% Na (recycled from cooling operation III), are leached, in operation I, in countercurrent with 1090 g. of water at 30° C. 310 g. of $K_2SO_4$ comprising 50% $K_2O$ and 2% $H_2O$ are obtained, besides 1620 g. of mother liquor T comprising 1.7% $K_2O$, 0.8% Na and 940 g. of intermediate mother liquor Q comprising 4.5% $K_2O$ and 4% Na.

3400 g. of recycle m.l. M comprising 33% $MgCl_2$ (from cooling operation III) are separately concentrated by evaporating 670 g. water, and reacted in operation II with 320 g. of kainite comprising 11.5% $K_2O$ and 15% Na, or 320 g. of mixed salt comprising 11.5% $K_2O$ and about 30% of kieserite at 120° C. All of the m.l. T and m.l. Q are then added, in operation II. 640 g. of kieseritic-halitic residues comprising 45–50% $MgSO_4 \cdot H_2O$ precipitate and are separated.

The residual mother liquors are cooled from 120° to 55° C. by natural cooling, through evaporation of 390 g. of water, 1000 g. of artificial carnallite comprising 33% $MgCl_2$, 0.3% $K_2O$ are separated from 3580 g. of m.l. M. 3400 g. of this carnallite are recycled to operation I, and 180 g. are utilized for further working.

*Example 2*

500 g. of kainite comprising 16.7% $K_2O$ and 3% Na, plus 1445 g. of recycled carnallite (from operation III) comprising 11% $K_2O$ and 2% Na, and 200 g. of washed kieserite comprising 15.5% Mg are leached in countercurrent with 1320 g. of water at 30° C. 310 g. of $K_2SO_4$ containing 50% $K_2O$, 2% $H_2O$, are obtained, besides 2135 g. of m.l. T containing 1.7% $K_2O$ and 1020 g. of m.l. Q.

4000 g. of recycled m.l. M from operation III, comprising 33% $MgCl_2$, are concentrated until 700 g. of water are evaporated, and reacted in operation II with 725 g. of kainite comprising 11.5% $K_2O$, 15% Na, at 120° C. Thereto the entire m.l. T and m.l. Q are added, after separately concentrating them by evaporating 180 g. of water. 1150 g. of kieseritic-halitic residues comprising 40% $MgSO_4 \cdot H_2O$ and 29% NaCl precipitate, and are separated.

The residual mother liquors are cooled from 120° to 55° C. by natural cooling, by evaporation of 410 g. of water. 1445 g. of artificial carnallite precipitate, and 4095 g. of mother liquors M comprising 33% $MgCl_2$, 0.3% $K_2O$, are left. 4000 g. of the mother liquors are recycled to operation II and 95 g. are utilized for further processing. The 1445 grams of carnallite are sent to operation I.

The 1150 g. of kieseritic residues of operation II are subjected to levitation to separate most of the NaCl from the kieserite. The kieseritic fraction is separated from washed with warm water so as to dissolve NaCl, to obtain 200 g. of clean kieserite which are recycled to the leaching in countercurrent, in operation I. This is illustrated in FIG. 4, in dotted lines at the right.

*Example 3*

365 g. of langbeinite comprising 21.3% $K_2O$ and 2% Na, as well as 1126 g. of recycling carnallite from operation III, containing 11% $K_2O$, 2% Na, are leached in countercurrent, in operation I, with 938 g. of water at 30° C. 310 g. of $K_2SO_4$ containing 50% $K_2O$, 2% Na are obtained, and also 1440 g. of m.l. T comprising 1.7% $K_2O$, 0.8% Na, and 678 g. of intermediate m.l. Q, comprising 4.5% $K_2O$, 4% Na.

3000 g. of m.l. M recycled from operation III, comprising 33% $MgCl_2$, are separately concentrated, by evaporating 400 g. of water, and reacted in operation II with 877 g. of natural carnallite comprising 10% $K_2O$, 5% $MgSO_4 \cdot H_2O$, and 13.5% Na, at 120° C. Then the entire m.l. Q and m.l. T are added thereto. 680 g. of kieseritic-halitic residues comprising 30% $MgSO_4 \cdot H_2O$, 42% NaCl, precipitate, and are separated.

The residual mother liquors from operation II are cooled from 120° to 55° C. by natural cooling, through evaporation of 370 g. of water; 1126 g. of artificial carnallite (which are recycled to operation I) are separated from 3610 g. of mother liquor M comprising 33% $MgCl_2$ and 0.3% $K_2O$. 3000 g. of said liquor are recycled to operation II, and 610 g. are utilized for further processing.

I claim:

1. A process for extracting potassium sulfate from a potassium mineral taken from the group consisting of kainite, kieserite and langbeinite, which comprises reacting, in a first operation, a portion of said mineral with artificial carnallite in water at 10° to 40° C., the mineral and the artificial carnallite being leached by and passing in countercurrent to the water, recovering potassium sulfate and removing mother liquor from the first operation, treating a second portion of potassium mineral taken from the group consisting of kainite, carnallite, sylvinite, potassium chloride and mixtures thereof in a second operation with said mother liquor of the first operation together with liquors comprising 30–35% $MgCl_2$, at 100° to 130° C., the second portion containing sodium chloride, the second operation causing the separation of a solid residue comprising kieserite and halite, and in a third operation cooling the mother liquors to 30° to 60° C. to separate artificial carnallite, which is then passed to the first operation, and to obtain a mother liquor from the third operation, comprising 30–35% $MgCl_2$ and passing at least part of the latter mother liquor to the second operation.

2. The process of claim 1, the mineral employed in the first operation having an NaCl content below 12%, the mineral employed in the second operation having an optional NaCl content.

3. A process according to claim 1, wherein the recycled artificial carnallite is at least partially replaced by carnallite of other origin.

4. A process according to claim 1, wherein the water employed in the first operative step is up to about 80% sea water.

5. A process according to claim 1, wherein the potassium mineral treated in the first operative step has a NaCl content not higher than 12%.

6. A process according to claim 1, wherein the potassium mineral, containing $SO_4$ ions, treated in the first operative step, is at least partially replaced by the kieseritic residue obtained in the second operative step, after purification thereof to remove NaCl.

7. A process according to claim 1, wherein the artificial carnallite obtained in the third operative step is separated from NaCl crystals, prior to being recycled to the first operation.

8. A process according to claim 1, wherein part of the artificial carnallite, produced in excess in the third operative step, is leached with water to produce potassium chloride.

9. A process of extracting potassium sulfate from a potassium mineral taken from the group consisting of kainite, kieserite and langbeinite, which is carried out in three working operations; the first operation comprising leaching a mineral of the above-mentioned kind in the presence of sulfate ions and artificial carnallite recycled from the third operation in countercurrent with water at from 10° C. to 40° C. so as to obtain solid potassium sulfate and residual mother liquor; the second operation comprising reacting a mineral of the above-mentioned kind, which must contain chloride ions when that used in the first operation does not, with concentrated magnesium chloride-containing mother liquor recycled from the third operation and the residual mother liquor from the first operation at from 100° C. to 130° C. to separate solid kieserite and halite; and the third operation comprising cooling the mother liquor from the second operation to from 30° C. to 60° C. so as to obtain artificial carnallite for recycling to the first operation and magnesium chloride-containing mother liquor for recycling to the second operation.

References Cited

UNITED STATES PATENTS

| 2,684,285 | 7/1954 | Dancy | 23—38 X |
| 2,687,339 | 8/1954 | Dancy et al. | 23—38 |
| 3,110,561 | 11/1963 | Henne et al. | 23—121 |

OSCAR R. VERTIZ, *Primary Examiner.*

MAURICE A. BRINDISI, *Examiner.*

E. C. THOMAS, *Assistant Examiner.*